United States Patent
Hirokawa et al.

[11] Patent Number: 6,095,751
[45] Date of Patent: Aug. 1, 2000

[54] SEAL DEVICE BETWEEN FASTENING BOLT AND BOLTHOLE IN GAS TURBINE DISC

[75] Inventors: Kazuharu Hirokawa; Rintaro Chikami, both of Takasago, Japan

[73] Assignee: Mitsubishi Heavy Industries, Ltd., Tokyo, Japan

[21] Appl. No.: 09/150,370

[22] Filed: Sep. 10, 1998

[30] Foreign Application Priority Data

Sep. 11, 1997 [JP] Japan ................. 9-246765

[51] Int. Cl.⁷ .................... F01D 5/06; F01D 5/18
[52] U.S. Cl. ................. 416/96 R; 416/198 A; 416/201 R; 415/114; 415/115
[58] Field of Search ................. 415/114, 115, 415/116; 416/95, 96 R, 96 A, 198 A, 200 A, 201 R

[56] References Cited

U.S. PATENT DOCUMENTS

| | | | |
|---|---|---|---|
| 2,317,092 | 4/1943 | Allen | 416/198 A |
| 4,184,797 | 1/1980 | Anderson et al. | 416/95 |
| 4,453,889 | 6/1984 | Sakata et al. | 416/198 A |
| 4,880,354 | 11/1989 | Teranishi et al. | 416/198 A |
| 5,758,487 | 6/1998 | Salt et al. | 415/114 |
| 5,795,130 | 8/1998 | Suenaga et al. | 416/95 |

FOREIGN PATENT DOCUMENTS

| | | | |
|---|---|---|---|
| 2 329 882 | 5/1977 | France . | |
| 57-210103 | 12/1982 | Japan | 416/198 A |
| 4-237833 | 8/1992 | Japan . | |
| 9-242563 | 9/1997 | Japan . | |
| 11-50803 | 2/1999 | Japan . | |

*Primary Examiner*—Christopher Verdier
*Attorney, Agent, or Firm*—Wenderoth, Lind & Ponack, L.L.P.

[57] ABSTRACT

A seal device between a fastening bolt and a bolthole in a gas turbine disc reduces cooling steam leaking from a gap between the fastening bolt and the bolthole. A gas turbine disc 31 carrying moving blades, a fastening bolt 33 for fixing the disc 31 passes through a bolthole 32. On a low pressure side of the disc 31, a bolthole diameter enlarged portion 39 having a larger diameter than that of the bolthole 32 is provided. Fastening bolt 33 is provided with a shaft diameter enlarged portion 33a. Seal piece 1 is fitted at one end around the shaft diameter enlarged portion 33a and is engaged at the other end with a stepped portion of the bolthole diameter enlarged portion 39. In operation of the gas turbine, the bolt 33 is biased outwardly be centrifugal force, and the gap between the bolt 33 and the bolthole 32 deforms. Nevertheless, the seal piece 1, having flexibility, deforms at bent portions $R_1$ and $R_2$ to maintain close contact and steam 43 is prevented from leaking from the high pressure side to the low pressure part 38, and the sealing ability is maintained.

3 Claims, 5 Drawing Sheets

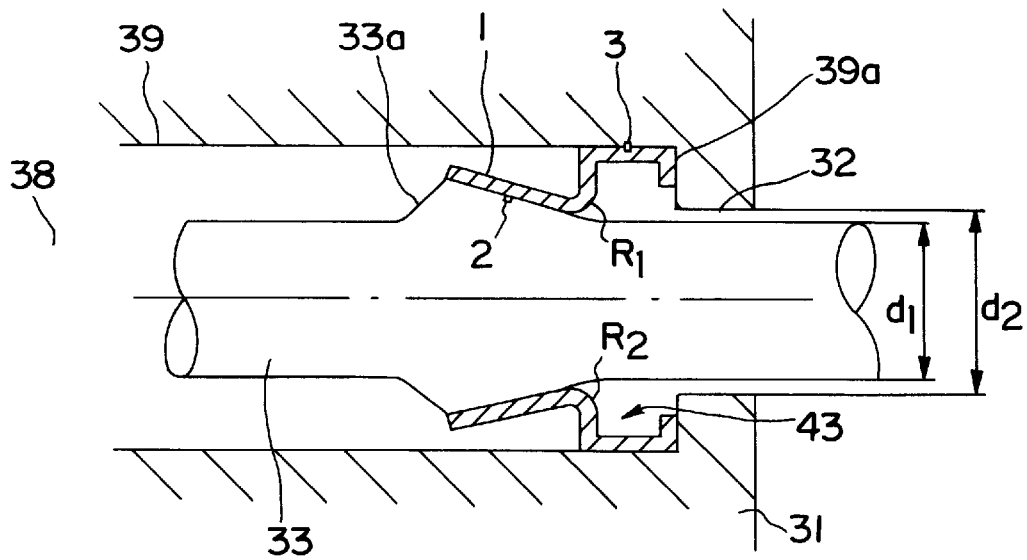
F I G. 2
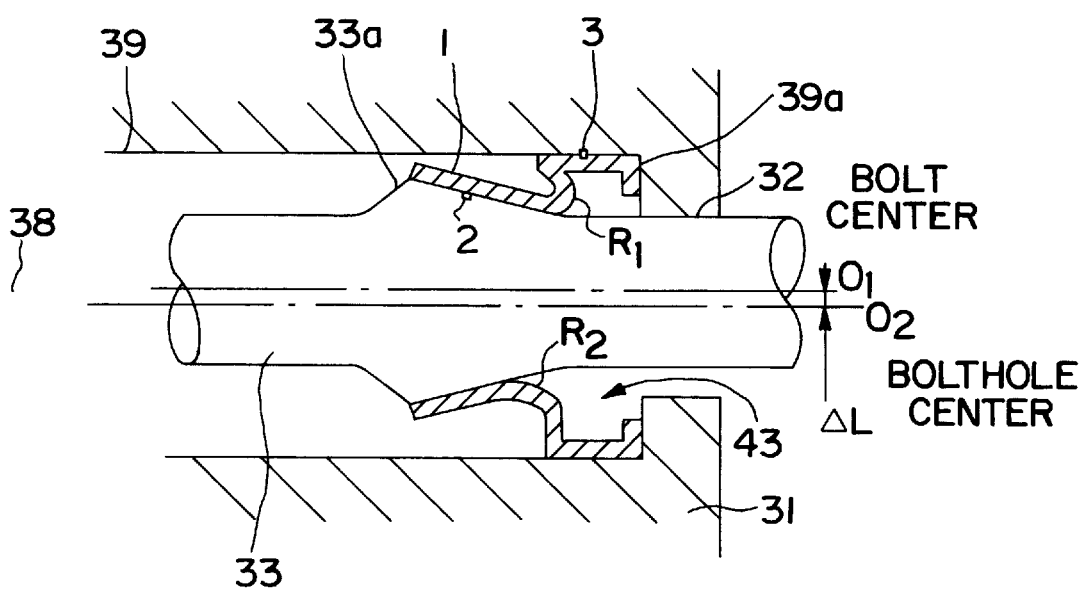
F I G. 3

SEAL DEVICE BETWEEN FASTENING BOLT AND BOLTHOLE IN GAS TURBINE DISC

BACKGROUND OF THE INVENTION

1. Field of the Invention

The present invention relates to a seal device between a fastening bolt and bolthole in a gas turbine disc, and more specifically to a seal device for sealing a gap between a fastening bolt and bolthole in a disc of a steam-cooled type gas turbine so as to reduce leakage of cooling medium to the outside.

2. Description of the Prior Art

In the present state of gas turbine cooling systems, air-cooled systems are the trend. Air is partially extracted from a compressor to be introduced into a stationary blade, a moving blade and a rotor for cooling thereof, and the air, after being used for cooling, is discharged into a combustion gas passage. Recently, along with a high efficiency power plant, a combined cycle plant is being developed in which a gas turbine and a steam turbine are used in combination, and a steam cooled system of a gas turbine is in the process of development to be used in the combined cycle plant. The steam-cooled system is such that steam is partially extracted from the steam turbine to be introduced into the stationary blade, the moving blade and the rotor of the gas turbine for cooling thereof. The steam, after being used for the cooling, is recovered to the steam turbine side for effective use thereof.

FIG. 6 is a cross sectional view showing one example of a steam-cooled type gas turbine in the prior art where such a steam-cooled system as mentioned above is employed and cooling of moving blades by steam is carried out, similar to the present invention. In FIG. 6, numerals 21, 22, 23 and 24 designate first to fourth stage moving blades, respectively, and numerals 51, 52, 53 and 54 designate first to fourth stage stationary blades, respectively. Numeral 31 designates a disc on a rotor side and numeral 32 designates a bolthole, which is provided in plural pieces along the circumferential direction in the disc 31 so as to pass through a disc portion in the axial direction, the disc portion carrying the moving blades 21 to 24 of the respective stages. Numeral 33 designates a fastening bolt which is inserted so as to pass through the bolthole 32 in the axial direction and to fixedly fasten the disc portion carrying the moving blades of the respective stages. Numeral 34 designates a steam introduction passage, into which steam of an appropriate temperature, extracted from the steam turbine side, is introduced via a disc end portion. Numeral 35 designates a steam recovery passage for recovering therethrough the steam after it has been used for the cooling of moving blades. The steam recovery passage 35 is provided so as to be deviated in phase from the steam introduction passage 34 in the circumferential direction. Numerals 36, 37, respectively, designate cavities of the disc 31.

The gas turbine of FIG. 6 is an example which employs a steam-cooled system for the first stage moving blade 21 and the second stage moving blade 22 and an air-cooled system for the third stage moving blade 23 and the fourth stage moving blade 24, as there is less thermal load and thus less advantage for a steam-cooled system in the latter two stages as compared with the former two stages. In FIG. 6, the extracted steam is fed into the disc 31 end portion to be supplied therefrom into the steam introduction passage 34. Steam 41 so supplied enters the cavity 36 and then, passing through a steam passage (not shown), enters the second stage moving blade 22 to cool the blade 22 while passing through an introduction side of a cooling steam passage provided in the blade 22. The steam, after being used for cooling, passes through a recovery side of the cooling steam passage to be recovered into the cavity 37. Likewise, the steam 41 enters the first stage moving blade 21 to cool the blade 21 and, after being used for the cooling, is recovered into the cavity 37.

The steam recovered after having cooled the first stage moving blade 21 and the second stage moving blade 22 gathers in the cavity 37 and then, passing through the steam recovery passage 35, is recovered from the disc 31 end portion as recovery steam 42 of an elevated temperature. It is returned to the steam turbine side for effective use thereof.

FIG. 7 is a cross sectional view taken on line X—X in arrow direction of FIG. 6. FIG. 7 shows a state where the rotor is rotating. The fastening bolt 33, inserted into the bolthole 32, has a diameter which is slightly smaller than that of the bolthole 32. With the rotor being rotated as shown there, the fastening bolt 33 is biased outwardly due to the centrifugal force, so that a gap S occurs on an inner side within the bolthole 32. A portion of the steam from the cavity 36 or 37 passes through the gap S and leaks into a low pressure part 38, as shown by numeral 43 in FIG. 6. If the amount of the leakage becomes large, a loss of recovery steam occurs so as to lower the efficiency.

As mentioned above, in the prior art gas turbine which uses air as a cooling medium, the stationary blade, moving blade and rotor are cooled by air, and the air, after having been used for cooling, is discharged into the combustion gas passage with no recovery thereof being necessitated. In the gas turbine which employs the steam-cooled system, however, the steam, after being used for cooling, is recovered to be returned to the steam turbine side, so that the temperature-elevated steam, through cooling, is used effectively. Therefore, if the steam leaks outside, it results in a loss of thermal energy by that degree, leading to a lowering of efficiency. In the prior art gas turbine, if the bolt is biased in the bolthole due to centrifugal force, a gap deformation occurs between the bolt and the bolthole. A problem in this case is that a ring-shaped seal component that is widely used in the prior art for sealing a gap of concentric circular shape cannot be used.

SUMMARY OF THE INVENTION

It is therefore an object of the present invention to provide a seal device between a fastening bolt and a bolthole in a gas turbine disc, and especially a seal device for sealing a gap between a fastening bolt and bolthole from where a large amount of leakage of steam occurs in a disc of a steam-cooled type gas turbine, thereby greatly reducing the leakage of steam to the outside even if the bolt is biased in the bolthole due to centrifugal force and the shape of the gap is deformed.

In order to attain the above object, the present invention provides the following:

(1) A seal device between a fastening bolt and a bolthole in a disc of a gas turbine, the disc of the gas turbine being constructed such that a bolthole is provided to pass through the disc in an axial direction thereof from front states to rear stages of the gas turbine. A fastening bolt is disposed in the bolthole so as to fix the disc, and a steam introduction passage and a steam recovery passage for moving blade cooling steam are provided in parallel with the fastening bolt in the disc so as to connect to an introduction side and a recovery side, respectively, of a cooling steam passage provided in each moving blade via respective independent cavities, whereby steam flows from the steam introduction passage to the steam recovery passage while cooling the blade and, after being used for cooling, is recovered. The seal device comprises a diameter-enlarged portion provided in the bolthole on a disc low pressure side thereof and a flexible seal piece disposed in the diameter enlarged portion so as to make close contact at one end portion of the seal piece with an outer periphery of the fastening bolt and at the other end portion of the seal piece with an inner wall of the diameter enlarged portion.

(2) A seal device between a fastening bolt and a bolthole in a disc of gas turbine as mentioned in (1) above, wherein the seal piece is divided into two seal pieces in the axial direction. One seal piece thereof makes close contact at its one end portion with the outer periphery of the fastening bolt and at its other end portion with the inner wall of the diameter enlarged portion. The other seal piece thereof is fixed to an inner periphery of a fitting element disposed in a stepped portion of the diameter enlarged portion. An O-ring is interposed between the two seal pieces and the inner wall of the diameter enlarged portion.

(3) A seal device between a fastening bolt and a bolthole in a disc of gas turbine as mentioned in (2) above, wherein the other seal piece is in a thread engagement with the inner periphery of the fitting element disposed in the stepped portion of said diameter enlarged portion.

The fastening bolt for the gas turbine disc, having a slightly smaller diameter than the bolthole, is inserted in the bolthole to fix the disc. While the rotor is rotating, the fastening bolt in the disc is biased outwardly in the bolthole by the centrifugal force of rotation, and the gap between the bolt and the bolthole deforms so that the inner side gap becomes larger than the outer side gap.

On the other hand, the steam introduction passage and the steam recovery passage for steam which cools the moving blades connect to the introduction side and the recovery side, respectively, of the cooling steam passage provided in each of the moving blades via the respective independent cavities. A portion of the steam for cooling the moving blades will flow out from the cavity through the gap between the fastening bolt and the bolthole. But, as mentioned above, the fastening bolt is biased and the gap deforms due to the centrifugal force, and thus a ring-shaped sealing component that is widely used in the prior art for sealing a gap of a concentric circular shape cannot exhibit its sealing function in the above case, as a gap still occurs if the ring-shaped sealing component is inserted as it is.

In the invention of (1) above, the seal piece is fitted around the fastening bolt at one end portion thereof and makes contact with the inner wall of the bolthole diameter enlarged portion at the other end portion, whereby the steam leaking from the high pressure side into the low pressure part can be prevented. This seal piece has sufficient flexibility and is made of a material of high tensile strength steel or the like which is excellent in a heat resistance. Accordingly, if the fastening bolt deforms to be biased in the bolthole by the centrifugal force, as mentioned above, that deformation is absorbed by the flexibility of the seal piece and the portion of the seal piece in close contact with the inner wall of the bolthole diameter enlarged portion and the outer periphery of the fastening bolt do not peel off, so that the steam is prevented from leaking and the sealing ability can be secured. Also, loss of thermal energy due to steam leakage can be prevented.

In the invention of (2) and (3) above, the seal piece is divided into two parts, whereby the workability at the time of assembling the seal piece is facilitated. That is, while one seal piece is fitted around the fastening bolt, the other seal piece can be fitted to the end portion of the bolthole diameter enlarged portion, and hence there is no need of assembling a seal piece of complicated shape formed in one unit around the fastening bolt in the bolthole.

BRIEF DESCRIPTION OF THE DRAWINGS

FIG. 2 is an enlarged cross sectional view of the seal device of the first embodiment of FIG. 1.

FIG. 3 is a cross sectional view showing a state of the fastening bolt of the seal device of FIG. 1 being biased.

DESCRIPTION OF THE PREFERRED EMBODIMENTS

Figure 1:
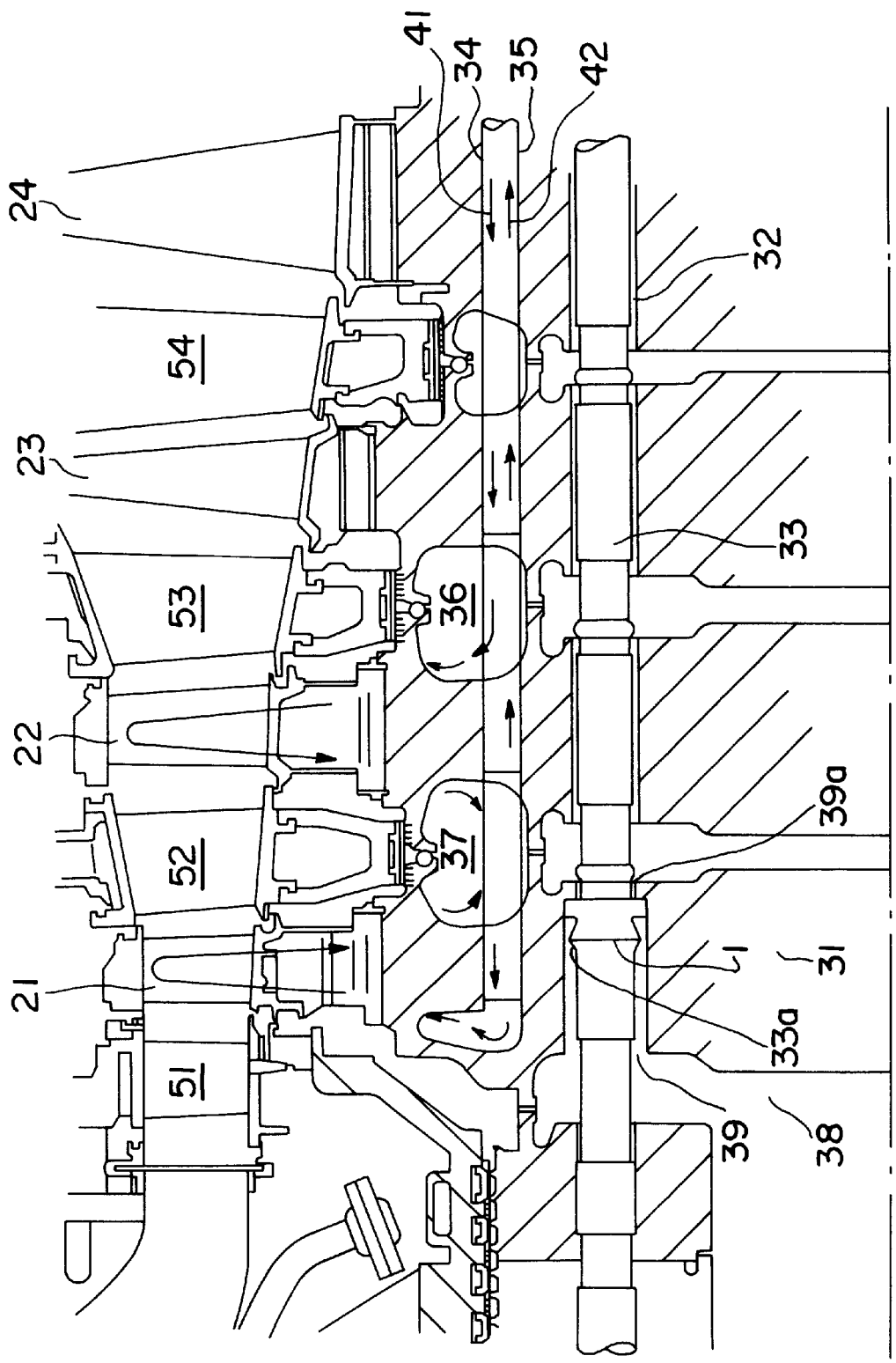
FIG. 1 is an entire cross sectional view showing a state of fitting of a seal device between a fastening bolt and a bolthole in a disc of a gas turbine in a first embodiment according to the present invention.
Figure 6:
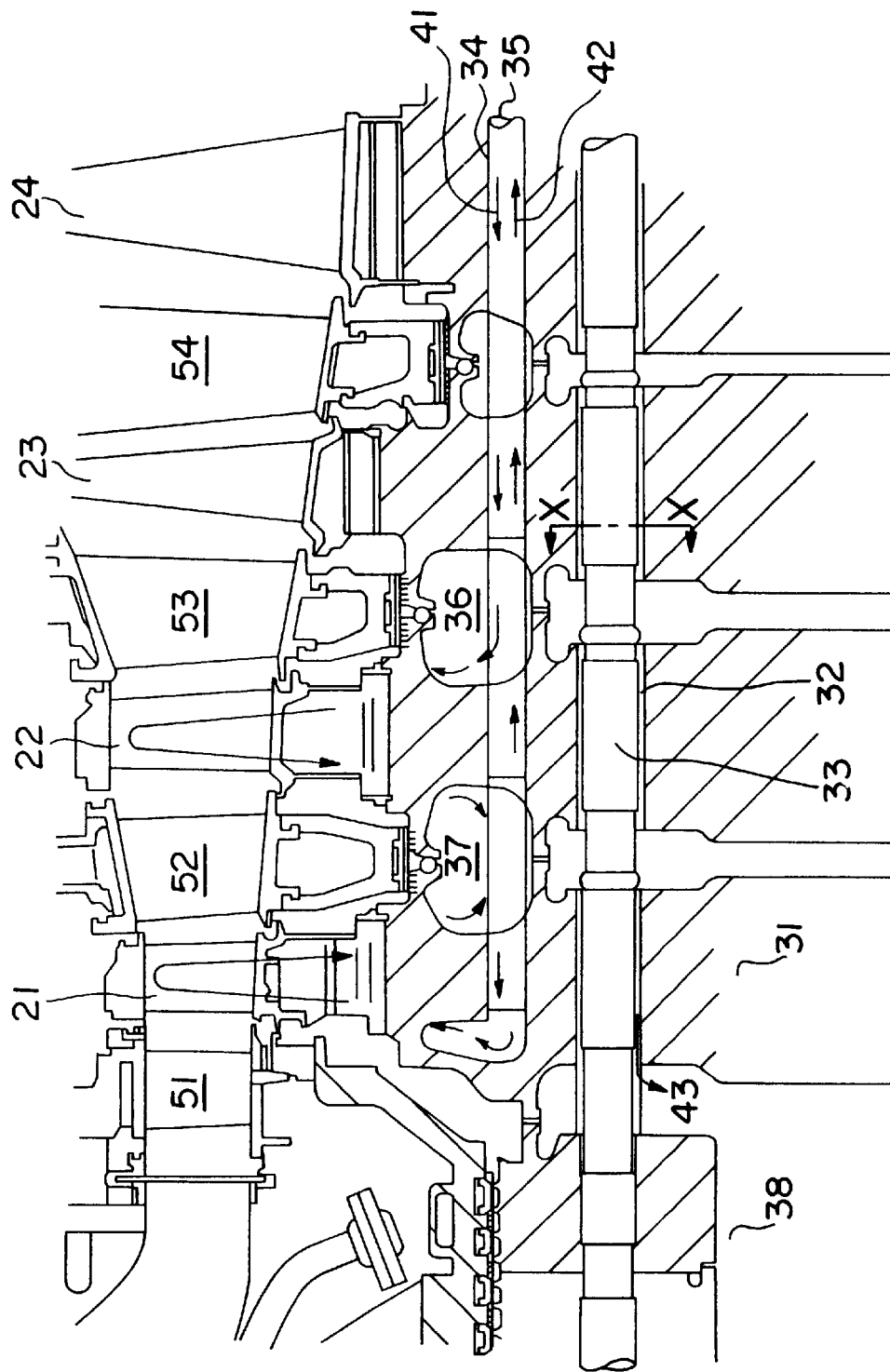
FIG. 6 is a cross sectional view showing one example of a steam-cooled type gas turbine in the prior art.
Figure 7:
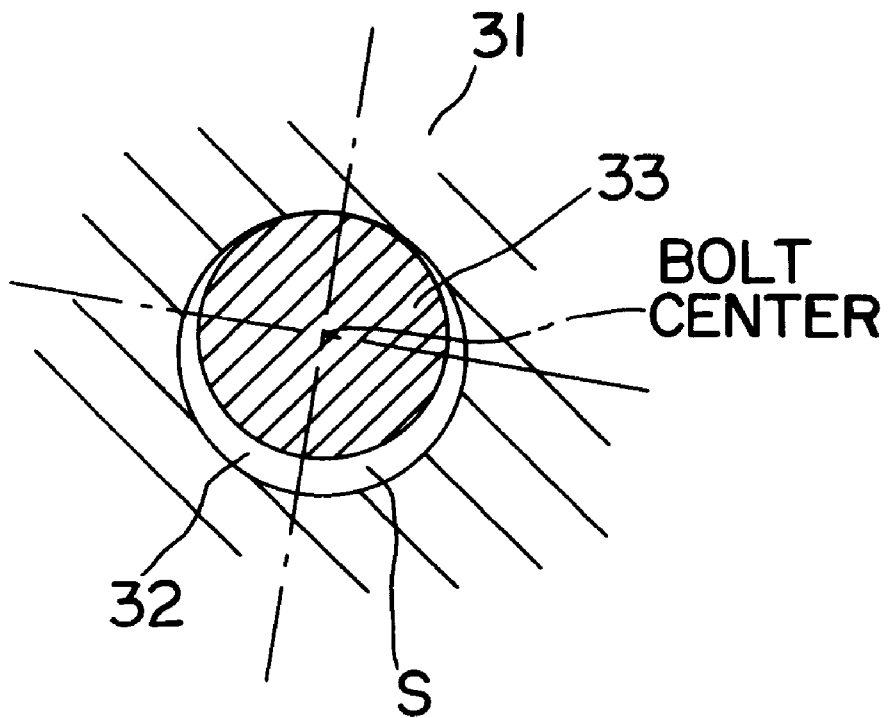
FIG. 7 is a cross sectional view taken on line X—X.

Herebelow, description will be made concretely on embodiments according to the present invention with reference to the figures. FIG. 1 is an entire cross sectional view showing a fitting state of a seal device between a fastening bolt and a bolthole in a disc of a gas turbine in a first embodiment according to the present invention. In FIG. 1, the structure of the gas turbine itself is the same as that of the prior art one shown in FIG. 6, with the same numerals being commonly used for designating the same components. Features of the present invention providing a seal piece 1 will be described in detail below.

FIG. 2 is an enlarged cross sectional view of a seal device comprising the seal piece 1. On a low pressure part 38 side of a bolthole 32 in a disc 31, there is provided a bolthole diameter enlarged portion 39. In the bolthole diameter enlarged portion 39, on the low pressure part 38 side of a fastening bolt 33, there is provided a shaft diameter enlarged portion 33a in which the diameter of the fastening bolt 33 is enlarged with a gradient. The seal piece 1 is disposed such that one end portion has a seal face 3 abutting the bolthole diameter enlarged portion 39 and a stepped portion 39a thereof so as to maintain a close contact therewith along the circumferential direction. Another end portion of the seal piece 1 has a seal face 2 fitted around the enlarged portion with gradient of the shaft diameter enlarged portion 33a so as to maintain close contact therewith.

On the low pressure part 38 side of the disc 31, there is bored the bolthole diameter enlarged portion 39 with a diameter larger than a diameter $d_2$ of the bolthole 32. At a terminal end portion of the bolthole diameter enlarged portion 39 is formed the stepped portion 39a which projects to extend to form the bolthole 32.

The fastening bolt 33 is inserted in the bolthole 32. A diameter $d_1$ of the fastening bolt 33 is smaller than the diameter $d_2$ of the bolthole 32, and the shaft diameter enlarged portion 33a is disposed in the bolthole diameter enlarged portion 39. A diameter of the enlarged portion with gradient of the shaft diameter enlarged portion 33a is larger than the diameter $d_1$ of the fastening bolt 33.

The seal face 2 of the seal piece 1 is urged onto an outer peripheral surface of the shaft diameter enlarged portion 33a by a differential pressure acting from a high pressure side on a low pressure side and by a flexibility of the seal piece 1 itself which absorbs relative deformation of the disc 31 and the bolt 32 in a longitudinal direction of the bolt 33. The seal face 3 of the seal piece 1 is also urged onto an inner peripheral surface of the bolthole diameter enlarged portion 39 by its own flexibility. The seal piece 1 is made of a material of high tensile strength steel or the like which may resist high temperatures and provide flexibility.

FIG. 3 is a cross sectional view showing the seal piece 1 when the fastening bolt 33 is biased outwardly due to the centrifugal force while the gas turbine is rotating. The fastening bolt 33 is moved outwardly within the bolthole 32 by the centrifugal force, and a deviation $\Delta L$ occurs between bolt center $O_1$ and bolthole center $O_2$. At this time, the seal piece 1, by its flexibility, contracts at its outer side bent portion $R_1$ and elongates at its inner side bent portion $R_2$, and thus the seal faces 2 and 3 make close contact with the outer peripheral surface of the shaft diameter enlarged portion 33a and the inner peripheral surface of the bolthole diameter enlarged portion 39, respectively, so as to maintain the sealing function.

In either of the states of FIGS. 2 and 3, leakage steam 43 which will flow out through a gap between the bolt 33 and the bolthole 32 is prevented from flowing into the low pressure side from the high pressure side by the seal faces 2 and 3 of the seal piece 1, even though the leakage steam 43 once flows into the bolthole diameter enlarged portion 39 through the gap. Thus, the steam is prevented from leaking into the low pressure part 38.

Figure 4:
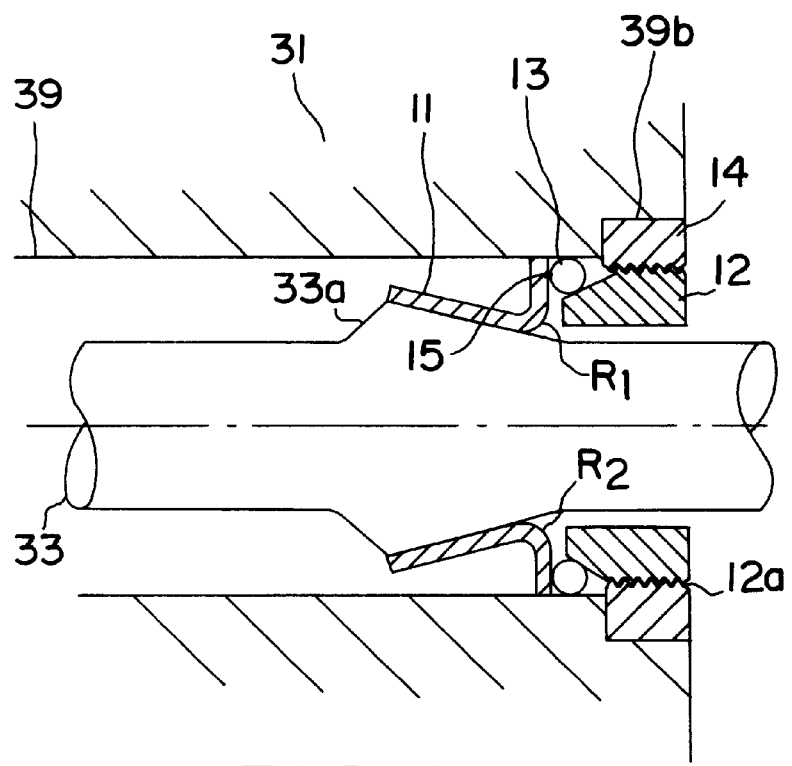
FIG. 4 is an enlarged cross sectional view of a seal device of a second embodiment according to the present invention.

FIG. 4 is an enlarged cross sectional view of a seal device of a second embodiment according to the present invention. A bolthole diameter enlarged portion 39 has a stepped portion 39b. This stepped portion 39b is recessed in the bolthole diameter enlarged portion 39 reversely of the stepped portion 39a of the first embodiment shown in FIGS. 2 and 3. A threaded fitting element 14 is fixed by being inserted into the stepped portion 39b, the outer periphery of the threaded fitting element 14 being interference-fitted into the stepped portion 39b. Numeral 11 designates a seal piece, one end portion of which is bent to enlarge vertically and to form a contact line 15 with an O-ring 13 and the other end portion of which makes close contact with an outer periphery of an enlarged portion with gradient of a shaft diameter enlarged portion 33a of the fastening bolt 33.

Another seal piece 12 has threaded portion 12a around its outer periphery and has a tapered portion at its one end. The threaded portion 12a is in a thread engagement with the threaded fitting element 14 so that the seal piece 12 is fixed. The O-ring 13 is pinched between a vertical face of the seal piece 11 and the tapered portion of the seal piece 12. The seal piece 11 is flexible at bent portions $R_1$ and $R_2$, like the seal piece 1 of the first embodiment, so as to absorb deformation due to biasing of the fastening bolt 33, like in FIG. 3. Thus, there are formed contact lines between the seal piece 11 and the O-ring 13, the seal piece 12 and the O-ring 13 and the O-ring 13 and an inner wall of the bolthole diameter enlarged portion 39, respectively, so that the respective seal faces are ensured.

Figure 5:
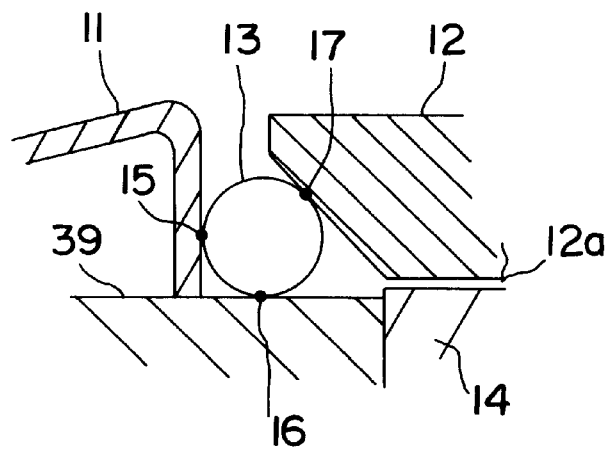
FIG. 5 is an enlarged cross sectional view of an O-ring portion of the seal device of FIG. 4.

FIG. 5 is an enlarged cross sectional view of the O-ring portion of the second embodiment. As shown there, by virtue of the three contact lines, that is, the contact line 15 of the O-ring 13 and the seal piece 11, a contact line 16 of the O-ring 13 and the inner wall of the bolthole diameter enlarged portion 39 and a contact line 17 of the O-ring 13 and the seal piece 12, the sealing function is secured. Thus the steam which will flow out from the high pressure side to the low pressure side through the gap between the bolt 33 and the bolthole 32 is prevented from so leaking.

It is understood that the invention is not limited to the particular construction and arrangement herein illustrated and described, but embraces such modified forms thereof as come within the scope of the following claims.

What is claimed is:

1. A seal device in a gas turbine which has a disc, front and rear stages, a steam introduction passage and a steam recovery passage in the disc for introducing and recovering cooling steam, moving blades of the front and rear stages having cooling steam passages, the cooling steam passages each having an introduction side and a recovery side, independent cavities connecting the introduction side of the cooling steam passages with the steam introduction passage and connecting the recovery side of the cooling steam passages with the steam recovery passage, whereby steam can flow from the steam introduction passage to the steam recovery passage while cooling the moving blades, and a disc low pressure side, said seal device comprising:

a bolthole passing through the disc in an axial direction of the disc and from the front stages of the gas turbine toward the rear stages of the gas turbine, said bolthole being parallel with the steam recovery passage and the steam introduction passage;

a fastening bolt disposed in said bolthole;

an enlarged diameter portion in said bolt hole on the disc low pressure side; and a flexible seal piece disposed in said enlarged diameter portion of said bolthole so as to closely contact an outer periphery of said fastening bolt at one end of said seal piece and an inner wall of said enlarged diameter portion at an other end of said seal piece.

2. The seal device of claim 1, wherein:

a fitting element is disposed in a stepped portion of said enlarged diameter portion;

said flexible seal piece is a first seal piece;

a second seal piece is fixed to an inner periphery of said fitting element; and an O-ring is interposed between said first and second seal pieces and the inner wall of said enlarged diameter portion.

3. The seal device of claim 2, wherein said second seal piece is in threaded engagement with the inner periphery of said fitting element.

* * * * *